United States Patent
Cheong et al.

(10) Patent No.: US 10,750,175 B2
(45) Date of Patent: Aug. 18, 2020

(54) QUANTIZATION PARTITIONING FOR ENHANCED IMAGE COMPRESSION

(71) Applicant: SONY CORPORATION, Tokyo (JP)

(72) Inventors: Hye-Yeon Cheong, San Jose, CA (US); Mohammed Golam Sarwer, San Jose, CA (US); Ali Tabatabai, Cupertino, CA (US)

(73) Assignee: SONY CORPORATION, Tokyo (JP)

( * ) Notice: Subject to any disclaimer, the term of this patent is extended or adjusted under 35 U.S.C. 154(b) by 45 days.

(21) Appl. No.: 15/586,420

(22) Filed: May 4, 2017

(65) Prior Publication Data

US 2018/0324427 A1    Nov. 8, 2018

(51) Int. Cl.
| | | |
|---|---|---|
| *H04N 19/124* | (2014.01) | |
| *H04N 19/18* | (2014.01) | |
| *H04N 19/60* | (2014.01) | |
| *H04N 19/119* | (2014.01) | |
| *H04N 19/146* | (2014.01) | |

(Continued)

(52) U.S. Cl.
CPC ......... *H04N 19/124* (2014.11); *H04N 19/146* (2014.11); *H04N 19/176* (2014.11); *H04N 19/18* (2014.11); *H04N 19/186* (2014.11); *H04N 19/60* (2014.11); *H04N 19/119* (2014.11)

(58) Field of Classification Search
CPC .... H04N 19/124; H04N 19/13; H04N 19/146; H04N 19/176; H04N 19/182; H04N 19/184; H04N 19/48; H04N 19/61
See application file for complete search history.

(56) References Cited

U.S. PATENT DOCUMENTS

| | | | | |
|---|---|---|---|---|
| 6,175,650 B1 * | 1/2001 | Sindhu | ................... | G06T 9/005 358/453 |
| 6,278,735 B1 * | 8/2001 | Mohsenian | .......... | H04N 19/176 375/240 |

(Continued)

FOREIGN PATENT DOCUMENTS

| | | |
|---|---|---|
| AU | 2011259939 A1 | 12/2012 |
| BR | 11-2012-030158 A2 | 12/2016 |

(Continued)

OTHER PUBLICATIONS

Auli-Llinas, et al., "Stationary Probability Model for Microscopic Parallelism in JPEG2000", IEEE Transactions on Multimedia, vol. 16, Issue 4, Jun. 2014, 11 pages.

(Continued)

*Primary Examiner* — Anner N Holder
(74) *Attorney, Agent, or Firm* — Chip Law Group

(57) ABSTRACT

An image-processing apparatus and method for quantization partitioning for enhanced image compression, includes storage of an input image in a first storage space having a first storage access bandwidth. The image-processing apparatus selects a plurality of QP values from a defined QP range for a first block of a plurality of blocks of the input image. The plurality of QP values are selected from the defined QP range based on defined criteria. The image-processing apparatus is configured to encode, by the selected plurality of QP values, the first block to generate an encoded bit stream of the first block. The encoded bit stream of the first block is storable in a reduced second storage space in the memory with a reduced second storage access bandwidth.

18 Claims, 5 Drawing Sheets

(51) Int. Cl.
*H04N 19/176* (2014.01)
*H04N 19/186* (2014.01)

(56) References Cited

U.S. PATENT DOCUMENTS

| | | | | |
|---|---|---|---|---|
| 6,603,813 | B1* | 8/2003 | Sriram | H04N 19/147 |
| | | | | 348/404.1 |
| 7,613,352 | B2 | 11/2009 | Mizuno | |
| 2001/0052038 | A1* | 12/2001 | Fallon | G06F 3/0613 |
| | | | | 710/68 |
| 2003/0007563 | A1* | 1/2003 | Ryu | H04N 19/132 |
| | | | | 375/240.13 |
| 2009/0213930 | A1 | 8/2009 | Ye et al. | |
| 2013/0071039 | A1 | 3/2013 | Sato | |
| 2013/0301739 | A1 | 11/2013 | Sato | |
| 2013/0343665 | A1* | 12/2013 | Maeda | H04N 19/50 |
| | | | | 382/233 |
| 2014/0321536 | A1 | 10/2014 | Sato | |
| 2014/0321537 | A1 | 10/2014 | Sato | |
| 2014/0321538 | A1* | 10/2014 | Sato | H04N 19/14 |
| | | | | 375/240.03 |
| 2017/0293561 | A1* | 10/2017 | Dwiel | G06F 12/0811 |
| 2017/0359583 | A1* | 12/2017 | Thirumalai | H04N 19/127 |
| 2018/0007370 | A1 | 1/2018 | Sato | |

FOREIGN PATENT DOCUMENTS

| | | |
|---|---|---|
| CA | 2713414 A1 | 8/2009 |
| CA | 2798927 A1 | 12/2011 |
| CA | 2974558 A1 | 12/2011 |
| CA | 2974561 A1 | 12/2011 |
| CN | 1717058 A | 1/2006 |
| CN | 101946516 A | 1/2011 |
| CN | 101848311 B | 9/2011 |
| CN | 102918837 A | 2/2013 |
| CN | 103369319 A | 10/2013 |
| CN | 103369320 A | 10/2013 |
| CN | 103369321 A | 10/2013 |
| CN | 103369322 A | 10/2013 |
| CN | 103369323 A | 10/2013 |
| CN | 105245882 A | 1/2016 |
| CN | 105245895 A | 1/2016 |
| CN | 107197279 A | 9/2017 |
| CN | 108366264 A | 8/2018 |
| EP | 2258113 A1 | 12/2010 |
| EP | 2579594 A1 | 4/2013 |
| EP | 2916546 A1 | 9/2015 |
| EP | 3177017 A1 | 6/2017 |
| EP | 3185559 A1 | 6/2017 |
| HK | 1213409 A1 | 6/2016 |
| HK | 1213714 A1 | 7/2016 |
| JP | 5350404 B2 | 11/2013 |
| JP | 6024709 B2 | 11/2016 |
| JP | 6048144 B2 | 12/2016 |
| KR | 10-2010-0120691 A | 11/2010 |
| KR | 10-2013-0084236 A | 7/2013 |
| KR | 10-2017-0118962 A | 10/2017 |
| KR | 10-2017-0118963 A | 10/2017 |
| KR | 10-2018-0014866 A | 2/2018 |
| KR | 10-20180014249 A | 2/2018 |
| MX | 341890 B | 9/2016 |
| MX | 342691 B | 10/2016 |
| MY | 163789 A | 10/2017 |
| RU | 2010138905 A | 3/2012 |
| RU | 2012150834 A | 10/2014 |
| RU | 2014115193 A | 10/2015 |
| RU | 2656718 C1 | 6/2018 |
| TW | 200948091 A | 11/2009 |
| TW | 201215151 A | 4/2012 |
| TW | 201421998 A | 6/2014 |
| TW | 201442486 A | 11/2014 |
| TW | 201442487 A | 11/2014 |
| WO | 2009/105732 A1 | 8/2009 |
| WO | 2011/152518 A1 | 12/2011 |
| ZA | 201208901 B | 9/2013 |

OTHER PUBLICATIONS

International Search Report and Written Opinion of PCT Application No. PCT/IB2018/052956, dated Sep. 25, 2018, 18 pages of ISRWO.

* cited by examiner

QUANTIZATION PARTITIONING FOR ENHANCED IMAGE COMPRESSION

CROSS-REFERENCE TO RELATED APPLICATIONS/INCORPORATION BY REFERENCE

None.

FIELD

Various embodiments of the disclosure relate to image compression. More specifically, various embodiments of the disclosure relate to an image-processing apparatus and method for quantization partitioning for enhanced image compression.

BACKGROUND

Recent advancements in the field of image compression have led to the development of various codecs to encode and decode digital image data or videos. Typically, a codec, such as an encoder, may compress an image before transmission of the compressed image to a decoder for decompression. The encoder may utilize various lossless or lossy image or video compression techniques to generate the encoded bit stream that may be transmitted, over a communication channel, to the decoder. In view of the increased popularity of high definition image or video, it is increasingly critical to develop advanced image compression techniques that may make possible high compression and still exemplify low hardware complexity. Therefore, a low latency and low complexity apparatus and method may be desired to efficiently compress digital data with visually lossless results.

In certain scenarios, the captured raw image may be divided into smaller blocks. All samples of a single coding block may not exhibit same properties. For example, frequency of certain samples in a coding block may be high as compared to remaining samples of the coding block. In certain conventional compression methods, all samples of a single coding block are usually quantized with same quantization parameter, which may not provide efficient compression. Therefore, an improved implementation of the codecs may be desired for high efficiently compression of digital data.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image-processing apparatus and method for quantization partitioning for enhanced image compression is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
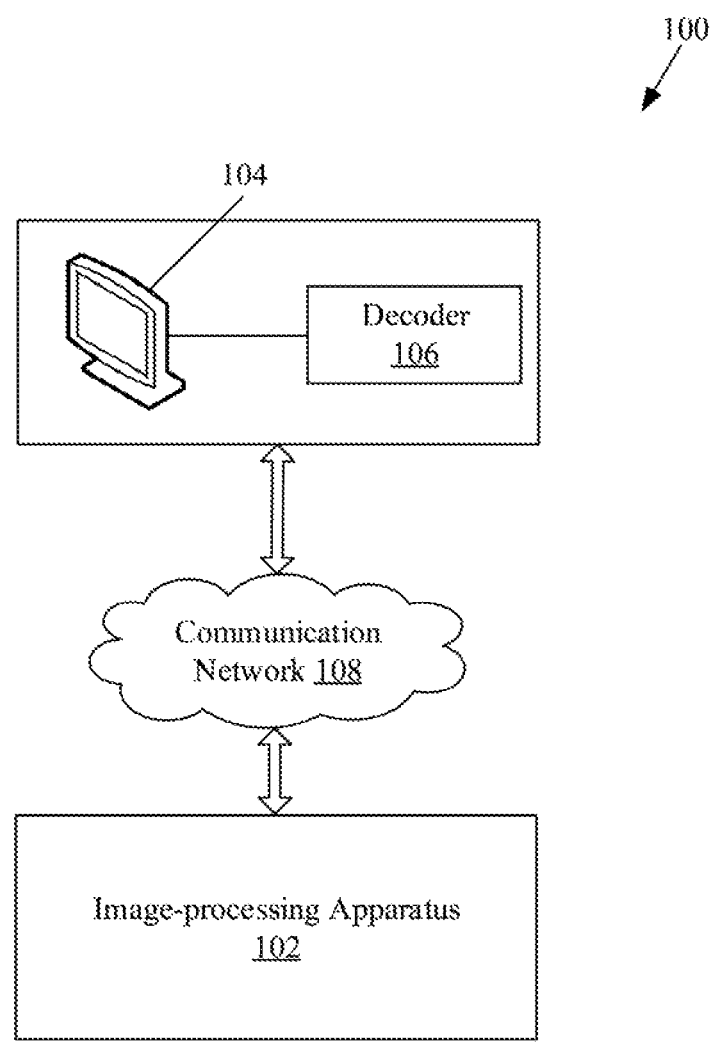
FIG. 1 is a block diagram that illustrates an exemplary network environment for quantization partitioning for enhanced image compression, in accordance with an embodiment of the disclosure.

The following described implementations may be found in the disclosed image-processing apparatus and method for quantization partitioning for enhanced image compression. Exemplary aspects of the disclosure may comprise a method for quantization partitioning for enhanced image compression implemented in an image-processing apparatus that may include a memory and one or more circuits. The memory may be configured to store an input image in a first storage space having a first storage access bandwidth. The one or more circuits may be configured to partition the stored input image into a plurality of blocks. The one or more circuits may be configured to select a plurality of quantization parameters (QPs) from a defined QP range for a first block of the plurality of blocks. The plurality of QP values may be selected from the defined QP range based on defined criteria. The one or more circuits may be further configured to encode, by the selected plurality of QP values, the first block to generate an encoded bit stream of the first block. The encoded bit stream of the first block may be storable in a reduced second storage space (in comparison to the first storage space) in the memory (e.g. a reduced second storage space in a dynamic random access memory (DRAM)) with a reduced second storage access bandwidth (in comparison to the first storage access bandwidth).

In accordance with an embodiment, the defined criteria for the selection of the plurality of QPs for the first block is based on further partition of the first block into a plurality of sub-blocks. The one or more circuits may be further configured to control the selection of the plurality of QP values from the defined QP range, based on a defined value and a difference between two QP values of the selected plurality of QP values. In accordance with an embodiment, the defined criterion for the selection of the plurality of QP values may be based on a plurality of color components associated with the first block. In accordance with yet another embodiment, the defined criterion for the selection of the plurality of QP values may be further based on application of a transform type on the first block to generate transformed coefficients. The defined criterion for the selection of the plurality of QP values may be further based on a frequency of each of the generated transformed coefficients of the first block.

In accordance with an embodiment, the encoded bit stream of the first block may be generated by a sequential encoding scheme. For example, the sequential encoding scheme may comprise a sequential application of transform coding, followed by quantization coding, predictive coding (optional), and entropy coding. The quantization coding may be applied on a result of the transform coding of the first block, based on the selected plurality of QP values.

In accordance with an embodiment, the one or more circuits may be configured to encode the selected plurality of QP values of the first block, to generate a plurality of encoded QP values. The selected plurality of QP values of the first block may be encoded by a fixed length code or a variable length code. The one or more circuits may be further configured to signal the generated plurality of encoded QP values in the generated encoded bit stream of the first block, to a decoder. The decoder may receive the encoded bit stream to extract the QP values of the first block for decompression.

FIG. 1 is a block diagram that illustrates an exemplary network environment for quantization partitioning for enhanced image compression, in accordance with an embodiment of the disclosure. With reference to FIG. 1, there is shown an exemplary network environment 100. The exemplary network environment 100 may include an image-processing apparatus 102. The exemplary network environment 100 may further include a display device 104, which may include a decoder 106. With reference to FIG. 1, there is further shown a communication network 108. The image-processing apparatus 102 and the display device 104 may be communicatively coupled with each other, via the communication network 108.

The image-processing apparatus 102 may comprise suitable logic, circuitry, interfaces, and/or code that may be configured to process digital image data and/or videos that are yet to be compressed. The image-processing apparatus 102 may be configured to partition the digital image data and/or videos, such as a digital image, into a plurality of blocks. For each block of the plurality of blocks, the image-processing apparatus 102 may be configured to select a plurality of QP values from a defined QP range for each block. Based on the selected plurality of QP values for each of the plurality of blocks, the image-processing apparatus 102 may be configured to encode each of the plurality of blocks of the digital image, to generate an encoded bit stream. The image-processing apparatus 102 may further encode the selected plurality of QP values for each of the plurality of blocks, to generate a plurality of encoded QP values. The image-processing apparatus 102 may be further configured to signal the generated plurality of encoded QP values in the generated encoded bit stream, to the decoder 106 that receives the encoded bit stream for decompression. Examples of the image-processing apparatus 102 may include, but are not limited to, a digital camera, an image sensor, a personal computer, a laptop computer, a computer workstation, a mainframe computer, a handheld computer, a cellular/mobile telephone, a smart appliance, a gaming console, a digital camcorder, a camera phone, a video player, a digital video disc (DVD) writer/player, a television, and/or an endoscopic device.

The display device 104 may comprise suitable logic, circuitry, interfaces, and/or code that may be configured to receive the encoded bit stream of the digital image from the image-processing apparatus 102, via the communication network 108. The decoder 106 of the display device 104 may be configured to decode the received encoded bit stream based on at least decoding of signals that indicates the plurality of encoded QP values of each of the plurality of blocks, to retrieve the digital image. The display device 104 may be configured to further render the decoded digital image. In an exemplary scenario, the display device 104 may be associated with various devices, such as, but not limited to, a digital camera, an image sensor, an endoscopic device, personal computer, a laptop computer, a computer workstation, a mainframe computer, a handheld computer, a personal digital assistant, a cellular/mobile telephone, a smart appliance, a gaming console, a digital camcorder, a camera phone, a video player, a DVD writer/player, and/or a television.

The decoder 106 may comprise suitable logic, circuitry, interfaces, and/or code that may be configured to decode the encoded bit stream of the digital image, received from the image-processing apparatus 102. A person ordinary skilled in the art will understand that the decoder 106 may be implemented in the image-processing apparatus 102, without deviation from the scope of the disclosure. In such a scenario, the display device 104 may be directly coupled to the image-processing apparatus 102. Alternatively stated, the image-processing apparatus 102 and the decoder 106 may be implemented as a single codec. In some embodiments, the disclosed method for quantization partitioning for enhanced image compression may also be implemented as an embedded codec (i.e. where codec is embedded with a chip). Both encoding and decoding operations may be performed in the embedded codec (i.e. the same chip). The compression achieved based on quantization partitioning may be used to reduce memory size (e.g. the DRAM size). In such a case, as the encoding and decoding operations are performed in the embedded codec (the same chip), transmission of encoded data through a communication network, may not be required or necessary for decoding. It is to be understood to a person of ordinary skill in the art that the implementation of the codec may be different based on different requirements or applications, without limiting the scope of the disclosure.

The communication network 108 may include a communication medium through which the image-processing apparatus 102 may communicate with the display device 104 and/or the decoder 106. The communication network 108 may be a wired or wireless communication channel or network. Examples of the communication network 108 may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), a Metropolitan Area Network (MAN), and/or the Internet. Various devices in the exemplary network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols, including variants thereof.

In operation, the image-processing apparatus 102 may be configured to receive digital image data and/or videos, such as an input image, from an external electronic device (not shown), via the communication network 108. In some embodiments, the input image may be captured by an image-capture device (not shown) integrated with the image-processing apparatus 102. The image-processing apparatus 102 may store the received input image in a first storage space having a first storage access bandwidth. A storage access bandwidth of an image may correspond to a bandwidth that may be required to access a storage space in the image-processing apparatus 102. For example, the first storage access bandwidth of the input image may correspond to "1 megabyte per second" to access the first storage space in the DRAM provided in the image-processing apparatus 102. The disclosed method for quantization partitioning for enhanced image compression reduces the DRAM bandwidth. The received input image may be transmissible from the image-processing apparatus 102 to the display device 104 in a certain time period, such as a first time period, via the communication network 108.

The image-processing apparatus 102 may be configured to partition the stored input image into a plurality of blocks. The stored input image may be partitioned into the plurality of blocks based on a size of a block. The size of the block may be determined based on a defined value, such as "8×8 pixel" block. Each block of the plurality of blocks may comprise a plurality of pixels. The number of pixels in each block may be determined based on the size of the block. Each pixel in the block may be further represented by a defined number of bits, such as a sequence of eight bits or more bits. Further, each pixel in each block of the plurality of blocks may be associated with a plurality of color components. For example, each pixel in each block may be represented by a luminance component and a chrominance component.

In accordance with an embodiment, the image-processing apparatus 102 may be configured to select a block, such as a first block, from the plurality of blocks of the stored input image. After the selection of the first block, the image-processing apparatus 102 may be configured to apply a sequential encoding scheme to the first block to generate an encoded first block that comprises an encoded bit stream of the first block. The sequential encoding scheme may have different coding architectures An example of the sequential encoding scheme may include a sequential application of transform coding, followed by quantization coding, predictive coding (optional), and entropy coding. The application of the sequential encoding scheme is based on a selection of a transform type, a plurality of QP values, a prediction type (optional), and a coding type for the first block.

The image-processing apparatus 102 may be configured to execute transform coding on the first block to generate transformed coefficients for the first block. The transform coding of the first block may be executed based on the transform type selected from a plurality of transform types, for example, a row-based transform and a column-based transform. In an exemplary embodiment, the transform type may correspond to a forward transform. In such scenario, the transform coding of the first block may be executed based on a forward transform type selected from a row-based forward transform and a column-based forward transform. Based on the application of the transform coding on pixel values of the first block, the first block may be transformed into frequency domain represented by the transformed coefficients. The generation of the transformed coefficients has been described in detail, for example, in FIG. 2.

The image-processing apparatus 102 may be configured to execute quantization coding on the transformed coefficients of the first block, to generate quantized-transformed coefficients of the first block. The quantization coding on the transformed coefficients of the first block may be controlled based on the plurality of QP values selected for the first block from a QP range defined for the first block. The plurality of QP values for the first block may be selected from the defined QP range based on defined criteria. In accordance with an embodiment, the defined criterion for the selection of the plurality of QP values may be based on the plurality of color components associated with the first block. For example, in a scenario where the plurality of color components of the first block corresponds to a "Y" color component, a "U" color component, and a "V" color component of a YUV color scheme, the image-processing apparatus 102 may select a different QP value for each of the "Y" color component, the "U" color component, and the "V" color component of the first block. The selection of the plurality of QP values for the first block based on the plurality of color components of the first block has been described in detail, for example, in FIG. 2.

In accordance with another embodiment, the defined criterion for the selection of the plurality of QP values may be based on further partition of the first block into a plurality of sub-blocks. The first block may be further partitioned into the plurality of sub-blocks based on a specified setting, for example, based on values of the transformed coefficients of the first block. The image-processing apparatus 102 may be configured to control the selection of the plurality of QP values from the defined QP range based on a defined value and at least an absolute value to minimize the signaling cost. For example, to minimize the signaling cost, two different QP values for quantization of the sub-blocks of the first block may be selected such that the difference between the two different QP values is less than or equal to the defined value, for example less than or equal to "1". The selection of the plurality of QP values for the first block based on the further partition of the first block into the plurality of sub-blocks has been described in detail, for example, in FIG. 2 and FIG. 3A.

In accordance with an embodiment, the defined criterion for the selection of the plurality of QP values may be based on the application of the transform type on the first block to generate the transformed coefficients. In such a scenario, the defined criterion for the selection of the plurality of QP values may be further based on a distribution, such as a frequency, of the generated transformed coefficients of the first block. The selection of the plurality of QP values for the first block based on the application of the transform type and frequencies of the generated transformed coefficients has been described in detail, for example, in FIGS. 2, 3B, and 3C. In accordance with an embodiment, the defined criterion for the selection of the plurality of QP values may also be based on a bit-coverage measure. For example, a bit-coverage value may be computed for the first block after application of different transform type or different sequential encoding schemes. The bit-coverage value may represent a count of bits encoded losslessly in each encoded block of the plurality of encoded blocks. For example, if out of "256 bits" of a block, "123 bits" are encoded lossless in an encoded block. The bit-coverage value for the encoded block is a value "123 bits". Examples of different sequential encoding schemes may include a sequential application of a transform type followed by quantization, a prediction type (such as DPCM), and entropy coding; or 1D row DCT followed by quantization, an all-frequency DPCM, and entropy coding, and the like. The transform type or the selected sequential encoding scheme that results in maximum bit-coverage value for the first block for a particular QP value from among the plurality of QP values, may be selected.

Based on the selected plurality of QP values for the first block, the image-processing apparatus 102 may be configured to execute quantization coding on a result of transform coding of the first block, to generate the encoded bit stream of the first block. For example, the quantization coding may be executed on the transformed coefficients of the first block based on the selected plurality of QP values, to generate the quantized-transformed coefficients of the first block. The generation of the quantized-transformed coefficients has been described in detail, for example, in FIG. 2. In accordance with an embodiment, the quantization coding may be followed by predictive coding and entropy coding to generate the encoded bit stream of the first block.

The image-processing apparatus 102 may execute predictive coding on the quantized-transformed coefficients of the first block, to generate quantized-transformed residual levels of the first block. The predictive coding of the first block may be executed based on the prediction type selected from a DC-only based modulation and all-frequency-based modulation. For example, the prediction type may correspond to a differential pulse-code modulation (DPCM). In such scenario, the predictive coding of the first block may be executed based on a DC-only DPCM and/or all-frequency DPCM. The generation of the quantized-transformed residual levels has been described in detail, for example, in FIG. 2.

The image-processing apparatus 102 may be configured to entropy encode the quantized-transformed residual levels of the first block to generate the encoded bit stream of the first block. The encoded bit stream of the first block may be generated by entropy coding on the quantized-transformed residual levels of the first block. The entropy coding may be executed by application of different coding types, such as Huffman table-based coding, Exponential-Golomb coding, conditional Golomb coding, Universal coding, Unary coding, Arithmetic coding, and/or the like. The generation of the encoded bit stream of the first block has been described in detail, for example, in FIG. 2.

The image-processing apparatus 102 may be configured to encode the selected plurality of QP values (for signaling in encoded form) for the first block to generate a plurality of encoded QP values. The selected plurality of QP values for the first block may be encoded, for example, by a fixed length coding or a variable length coding. The image-processing apparatus 102 may further transmit the generated encoded bit stream of the first block to the decoder 106, via the communication network 108. In accordance with an embodiment, the plurality of encoded QP values of the first block may be further signaled in the generated encoded bit stream, to the decoder 106 that receives the encoded bit stream for decompression. The encoding of the first block, by use of the selected plurality of QP values, may generate the encoded bit stream that is storable in a reduced second storage space (in comparison to the first storage space) having a reduced second storage access bandwidth (in comparison to the first storage access bandwidth) in the memory. Further, the generated encoded bit stream may be transmissible to the decoder 106 in a reduced second time period (in comparison to the first time period), thereby, improving the overall operating speed and an extent of compression achieved for the image-processing apparatus 102. Similar to the generation of the encoded bit stream of the first block, the image-processing apparatus 102 may be configured to generate the encoded bit stream of each of the remaining plurality of blocks of the stored input image. Further, the generated encoded bit stream of the remaining plurality of blocks may be transmitted to the decoder 106 for the decompression of the respective remaining plurality of blocks.

The decoder 106 may be configured to receive the encoded bit stream that may include encoded header data from the image-processing apparatus 102, via the communication network 108. The encoded header data may include signal parameters, such as the plurality of encoded QP values, the transform type used, DPCM type, and the like, for compression of the first block. The plurality of encoded QP values of the first block may be decoded by the decoder 106, to retrieve the plurality of QP values that have been used for quantization of the first block. Based on at least the retrieved plurality of QP values, the decoder 106 may decode the encoded bit stream of the first block by an inverse operation. The inverse operation may be executed based on application of a sequential decoding scheme. The sequential decoding scheme may comprise, for example, a sequential application of inverse entropy coding, followed by DPCM demodulation (optional), inverse quantization based on the retrieved plurality of QP values, and inverse transform. Similar to decoding of the encoded bit stream of the first block, the decoder 106 may further decode the remaining plurality of encoded blocks to control display of the image on the display device 104.

Figure 2:
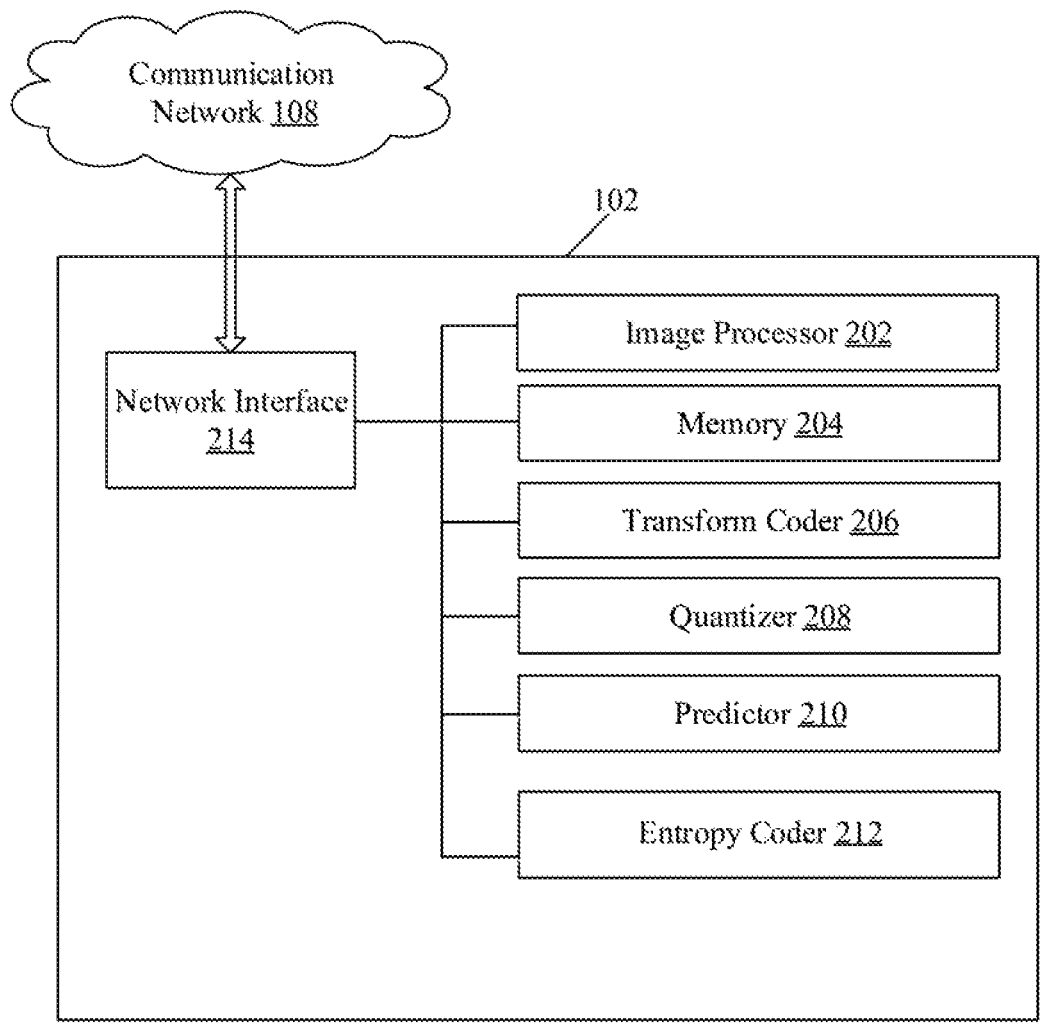
FIG. 2 is a block diagram that illustrates an exemplary image processing apparatus for quantization partitioning for enhanced image compression, in accordance with an embodiment of the disclosure.

FIG. 2 is a block diagram that illustrates an exemplary image processing apparatus for quantization partitioning for enhanced image compression, in accordance with an embodiment of the disclosure. FIG. 2 is described in conjunction with elements from FIG. 1. With reference to FIG. 2, there is shown a block diagram of an exemplary image-processing apparatus, such as the image-processing apparatus 102. The image-processing apparatus 102 may include one or more circuits, such as an image processor 202, a memory 204, a transform coder 206, a quantizer 208, a predictor 210, and an entropy coder 212. The image-processing apparatus 102 may further include a network interface 214. With reference to FIG. 2, there is further shown the communication network 108 (FIG. 1).

In accordance with an embodiment, the image processor 202 may be communicatively coupled to the memory 204, the transform coder 206, the quantizer 208, the predictor 210, the entropy coder 212, and the network interface 214. The network interface 214 may be configured to communicate with the display device 104 and/or the decoder 106, via the communication network 108, under the control of the image processor 202.

The image processor 202 may comprise suitable logic, circuitry, interfaces, and/or code that may be configured to execute a set of instructions stored in the memory 204. The image processor 202 may be configured to receive digital image data and/or videos, such as an input image, from the external electronic device or the image-capture device integrated with the image-processing apparatus 102. The image processor 202 may be configured to partition the input image into a plurality of blocks. The image processor 202 may be further configured to instruct the transform coder 206, the quantizer 208, the predictor 210, and/or the entropy coder 212, to generate an encoded bit stream of each of the plurality of blocks of the input image. The image processor 202 may be implemented based on a number of processor technologies, which are known in the art. Examples of the image processor 202 may be an X86-based processor, a Reduced Instruction Set Computing (RISC) processor, an Application-Specific Integrated Circuit (ASIC) processor, a Complex Instruction Set Computing (CISC) processor, and/or other processors or control circuits.

The memory 204 may comprise suitable logic, circuitry, interfaces, and/or code that may be configured to temporarily store the received input image, such as an image buffer. The memory 204 may be further configured to store a set of instructions executable by the image processor 202, the transform coder 206, the quantizer 208, the predictor 210, and/or the entropy coder 212, to generate the encoded bit stream. The memory 204 may be further configured to store operating systems and associated applications of the image-processing apparatus 102. Examples of implementation of the memory 204 may include, but are not limited to, Random Access Memory (RAM), Dynamic Random Access Memory (DRAM), Static Random Access Memory (SRAM), Thyristor Random Access Memory (T-RAM), Zero-Capacitor Random Access Memory (Z-RAM), Read Only Memory (ROM), Hard Disk Drive (HDD), a Secure Digital (SD) card, flash drive, cache memory, and/or other non-volatile memory.

The transform coder 206 may comprise suitable logic, circuitry, interfaces, and/or code that may be configured to execute transform coding on each of the plurality of blocks of the input image stored in the memory 204. The execution of transform coding on a block of the plurality of blocks may transform pixel data of the block to frequency domain. The transformed pixel data of the block may be referred to as transformed coefficients. The transform coding may be executed by a forward transform, such as one or two dimensional forward discrete cosine transform (FDCT). Examples of the transform coder 206 may be implemented as the ASIC or the FPGA.

The quantizer 208 may comprise suitable logic, circuitry, interfaces, and/or code that may be configured to execute quantization coding on the transformed coefficients of the block. The quantization coding may be executed on the transformed coefficients of the block based on a plurality of QP values selected for the block from a defined QP range, to generate quantized-transformed coefficients of the block.

The predictor 210 may comprise suitable logic, circuitry, interfaces, and/or code that may be configured to execute predictive coding on the quantized-transformed coefficients of the block. The predictive coding may refer to DC-only DPCM or all-frequency DPCM, to compute DPCM for each of the quantized-transformed coefficients. The predictor 210 may be implemented on an ASIC or FPGA. In an implementation, the quantizer 208 may be implemented on the same ASIC as the predictor 210.

The entropy coder 212 may comprise suitable logic, circuitry, interfaces, and/or code that may be configured to execute entropy coding on the quantized-transformed residual levels (or the quantized-transformed coefficients) of the block. The entropy coding may be executed by application of different coding types, to generate an encoded bit stream of the block. The different coding types may correspond to, but are not limited to, Huffman table-based coding, Exponential-Golomb coding, conditional Golomb coding, Universal coding, Unary coding, and Arithmetic coding. The entropy coder 212 may be implemented as the ASIC or the FPGA.

The network interface 214 may comprise suitable logic, circuitry, interfaces, and/or code that may be configured to communicate with the display device 104 (as shown in FIG. 1), via the communication network 108 (as shown in FIG. 1). The network interface 214 may be implemented by application of known technologies to support wired or wireless communication of the image-processing apparatus 102 with the communication network 108. Components of the network interface 214 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

In operation, the image processor 202 may be configured to receive digital image data and/or videos, such as an input image, from the external electronic device, via the communication network 108. In accordance with an embodiment, the input image may be captured by the image-capture device, such as a camera, integrated with the image-processing apparatus 102. In some embodiments, the input image may be extracted from a repository, via the communication network 108, based on an instruction provided by a user (not shown) associated with the image-processing apparatus 102. Further, the image processor 202 may be configured to store the received input image in a first storage space having a first storage access bandwidth in the memory 204. The first storage access bandwidth may also be referred to as a memory access bandwidth.

The image processor 202 may be configured to partition the stored input image into a plurality of blocks. The stored input image may be partitioned into the plurality of blocks based on a defined value of a size of a block, retrieved or otherwise acquire from the memory 204, such as, "8×8 pixel" block. In another example, the size of the block may be determined in real time or near-real time based on a current available bandwidth of the communication network 108. In yet another example, the size of the block may correspond to a value provided by the user in real time or near-real time. For example, if the input image is of size, "32×32", and the value of size of block is "8×8", the image processor 202 may partition the input image into "4 blocks". In accordance with an embodiment, each of the plurality of blocks may comprise a plurality of pixels, and each of the plurality of pixels may be represented by a defined number of bits, referred to as a bit depth. For example, if each pixel of the block is represented by eight bits or sixteen bits, the bit depth may be a value "8" or "16" respectively. Further, each pixel of the plurality of pixels may be sampled into a plurality of color components, for example, an RGB-based color components (for example, a red ("R") component, a green ("G") component, and a blue ("B") component) and/or a YUV color scheme based color components (for example, a luminance component ("Y") and two chrominance components ("U or Cb" and "V or Cr")).

For the sake of brevity, the ongoing description has been described with reference to a single block, for example, a first block selected from the plurality of blocks of the input image. However, the scope of the disclosure is not limited to the single block of the input image. Similar to the encoding processes executed on the first block, other blocks of the plurality of blocks of the input image may be processed to generate an encoded bit stream.

The image processor 202 may be configured to communicate the first block to the transform coder 206. The transform coder 206 may be configured to execute transform coding on the first block by a forward transform, to transform pixel values of the first block into frequency domain. For example, the transform coding of the first block may be executed by one dimensional (1D) FDCT (for example, row-based 1D FDCT or column-based 1D FDCT) to generate transformed coefficients of the first block. In some embodiments, the transform coding of the first block may be done by two-dimensional (2D) FDCT. The transformed coefficients of the first block may include a DC value. The DC value may be zero or non-zero value. For example, in case of a 8×8 block, there will be one DC coefficient when 8×8 two dimensional FDCT is used. In such as case, a first transformed coefficient in the transformed coefficients of the first block may correspond to the DC value, which is an integer value. The remaining transformed coefficients in the transformed coefficients of the first block other than the DC value may correspond to AC values. In other words, in the 8×8 block when 8×8 two dimensional FDCT is used, the DC value (at coordinates 0, 0 of the 8×8 block) is a non-zero value, followed by 63 AC values, with non-zero and/or zero values. But if one dimensional (8×1) FDCT is applied in 8×8 block, there will be total 8 DC coefficients.

The transform coder 206 may be configured to communicate the transformed coefficients of the first block to the quantizer 208. The quantizer 208 may be configured to execute quantization coding on the transformed coefficients of the first block, to generate quantized-transformed coefficients of the first block. The quantization coding of the transformed coefficients of the first block may be executed, based on a plurality of QP values. The plurality of QP values for the first block may be selected from a QP range defined for the first block. The QP range for the first block may be determined based on the bit-depth of pixels in the first block. For example, if the bit-depth of pixels in the first block is "8", then the quantizer 208 may determine the QP range for the first block as "0" to "7". The range of QP value may also depend on the transform coefficient used. For example, input pixel bit depth=8. After transform, the bit depth may be increased. For example, if 8×1 transform is applied, bit depth of the transform coefficient is 11. In this case, the range of QP value is "0 to 10". Similarly, if 4×1 transform is used, bit depth of the transform coefficient is 10. In this case, the range of QP is "0 to 9". If the transform application is skipped (or transform not used for compression in certain selected compression mode), then the QP range is "0" to "bitdepth−1" (bitdepth minus 1).

Thereafter, the plurality of QP values for the first block may be selected from the defined QP range based on a defined criterion, or a combination of different criteria thereof. In accordance with an embodiment, the defined criterion for the selection of the plurality of QP values may be based on the plurality of color components associated with the first block. For example, based on the RGB color components in the first block, the quantizer 208 may select a QP value for each of an R-color component based first block, a G-color component based first block, and a B-color component based first block. The R-color component based first block may correspond to the first block in which the pixel values are associated with the "R" color component of the RGB color components. The G-color component based first block may correspond to the first block in which the pixel values are associated with the "G" color component of the RGB color components. The B-color component based first block may correspond to the first block in which the pixel values are associated with the "B" color component of the RGB color components.

In accordance with another embodiment, the defined criterion for the selection of the plurality of QP values may be based on the transform type applied on the first block and/or frequencies of the generated transformed coefficients. For example, based on a plurality of frequencies of the transformed coefficients generated by the application of the transform type (a row-based transform type or a column-based transform type), the transformed coefficients of the first block may be classified. The transformed coefficients of the first block may be classified into a plurality of categories, for example, a low-frequency-based category and a high-frequency-based category, based on a comparison of each of the plurality of frequencies with a threshold frequency value. Further, the plurality of categories of the transformed coefficients may be obtained either in a row-wise direction or a column-wise direction, based on the applied transform type. For example, in a scenario where the transformed coefficients of the first block are generated by the row-based transform type, the transformed coefficients of the first block are classified into the low-frequency-based category and the high-frequency-based category in the column-wise direction. Similarly, in a scenario where the transformed coefficients of the first block are generated by the column-based transform type, the transformed coefficients are classified into the low-frequency-based category and the high-frequency-based category in the row-wise direction. Thereafter, the quantizer 208 may select at least one QP value for each of the low-frequency-based category and the high-frequency-based category, from the defined QP range. The selection of the plurality of QP values for the first block that is done based on the application of the transform type and the plurality of frequencies of the generated transformed coefficients has been described in detail, for example, in FIG. 3B and FIG. 3C.

In accordance with an embodiment, the defined criterion for the selection of the plurality of QP values may be based on further partition of the first block into a plurality of sub-blocks. The first block may be further partitioned into the plurality of sub-blocks, for example, based on values of the transformed coefficients of the first block. The quantizer 208 may be configured to control the selection of the plurality of QP values from the defined QP range based on a defined value and at least an absolute value. The absolute value may correspond to a difference between two QP values of the selected plurality of QP values. The selection of the plurality of QP values for the first block based on the further partition of the first block into the plurality of sub-blocks has been described in detail, for example, in FIG. 3A.

In accordance with an embodiment, the defined criterion for the selection of the plurality of QP values may also be based on a degree of compression that has to be achieved and/or content in the first block, such as pixel values associated with the first block. In some embodiments, the defined criterion for the selection of the plurality of QP values may also be based on a current available bandwidth of the communication network 108, via which the encoded bit stream may be transmitted to the decoder 106.

Based on the selected plurality of QP values for the first block, the quantizer 208 may be configured to compute a plurality of quantization steps. Thereafter, the transformed coefficients of the first block may be quantized by quantization coding, based on the computed plurality of quantization steps. In order to avoid floating point operation, the quantizer 208 may use the selected plurality of QP values directly without computing the plurality of quantization steps to execute quantization coding on the transformed coefficients of the first block. The quantization of the transformed coefficients of the first block may generate quantized-transformed coefficients of the first block.

In scenarios where transform coding is executed based on the 2D FDCT by the transform coder 206, the predictive coding based on the DPCM by the predictor 210, may be skipped. In such exemplary scenario, the quantizer 208 may be configured to communicate the quantized-transformed coefficients of the first block to the entropy coder 212. However, in scenarios where transform coding is executed based on the 1D FDCT by the transform coder 206, the quantizer 208 may be configured to communicate the quantized-transformed coefficients of the first block to the predictor 210. The predictor 210 may be configured to execute predictive coding, such as the DPCM, on the quantized-transformed coefficients of the first block. The predictor 210 may select a prediction type from a DC-only DPCM and an all-frequency DPCM, to compute DPCM for each of the quantized-transformed coefficients of the first block. Based on the computed DPCM for each of the quantized-transformed coefficients of the first block, the predictor 210 may be configured to determine quantized-transformed residual levels of the first block.

The predictor 210 may be configured to communicate the quantized-transformed residual levels of the first block to the entropy coder 212. The entropy coder 212 may be configured to execute entropy coding on the quantized-transformed residual levels of the first block to generate an encoded first block that comprises the encoded bit stream of the first block. The entropy coding may be executed by different coding types. The different coding types may be selected based on the DC component and the AC components associated with the first block. For example, the DC component of the quantized-transformed residual levels may be encoded in association with the predictor 210 by PCM-based coding. Further, the AC components of the quantized-transformed residual levels may be encoded by entropy coding, such as Huffman table-based coding, Exponential-Golomb coding, conditional Golomb coding, Universal coding, Unary coding, Arithmetic coding, and/or the like.

The entropy coder 212 may be configured to encode the selected plurality of QP values for the first block to generate a plurality of encoded QP values. The selected plurality of QP values for the first block may be encoded by a fixed length code or a variable length code. The entropy coder 212 may further transmit the generated encoded bit stream of the first block to the decoder 106, via the communication network 108. The plurality of encoded QP values may be further signaled along with the generated encoded bit stream of the first block, to the decoder 106 that receives the encoded bit stream for decompression. Similar to the generation of the encoded bit stream of the first block, the image-processing apparatus 102 may be configured to generate the encoded bit stream of each of the remaining plurality of blocks of the stored input image. Further, the generated encoded bit stream of the remaining plurality of blocks may be transmitted to the decoder 106 for the decompression of the respective remaining plurality of blocks.

Figure 3A:
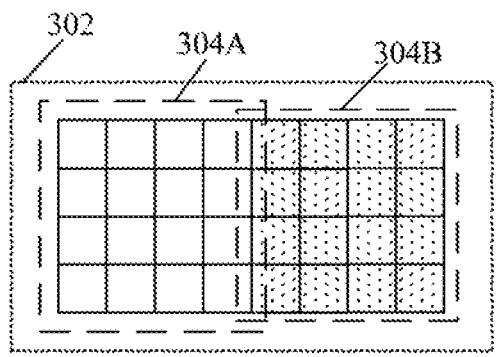
FIG. 3A is a block diagram that illustrates a first exemplary scenario for quantization partitioning for enhanced image compression, in accordance with an embodiment of the disclosure.

FIG. 3A is a block diagram that illustrates a first exemplary scenario for quantization partitioning for enhanced image compression, in accordance with an embodiment of the disclosure. FIG. 3A is described in conjunction with elements from FIG. 1 and FIG. 2. With reference to FIG. 3A, an exemplary block 302 that corresponds to a first block of a plurality of blocks of an input image is illustrated. The exemplary block 302 may correspond to an "8×4 block", as shown. The exemplary block 302, as shown, is further partitioned into a plurality of sub-blocks, for example, a first sub-block 304A and a second sub-block 304B.

The exemplary block 302 may comprise a plurality of pixel values. The image processor 202 may further partition the exemplary block 302 into the first sub-block 304A and the second sub-block 304B, based on specified settings. For example, the exemplary block 302 may be partitioned into the first sub-block 304A and the second sub-block 304B based on values of the transformed coefficients of the exemplary block 302. In another exemplary scenario, the exemplary block 302 may be equally partitioned (either in a row-wise direction or a column-wise direction) into the first sub-block 304A and the second sub-block 304B. For example, for a "8×4 block", as shown, the exemplary block 302 may be equally partitioned along the column-wise direction, such that each of the first sub-block 304A and the second sub-block 304B corresponds to a "4×4 block". Based on the partition of the exemplary block 302 into the first sub-block 304A and the second sub-block 304B, the quantizer 208 may be configured to select a plurality of QP values, for example, a first QP value and a second QP value, from a defined QP range. The first QP value for the first sub-block 304A may be selected from the defined QP range based on a degree of compression that has to be achieved for the first sub-block 304A. In another example, the first QP value for the first sub-block 304A may be selected from the defined QP range based on a current available bandwidth of the communication network 108 via which the encoded bit stream may be transmitted to the decoder 106. Similar to the selection of the first QP value for the first sub-block 304A, the quantizer 208 may select the second QP value for the second sub-block 304B. In order to reduce the signaling cost, the selection of the first QP value and the second QP value may be controlled, such that a difference between the first QP value and the second QP value is less than or equal to a defined value, for example, "1". In an illustrative embodiment, the quantizer 208 may utilize the following exemplary equation (1) to perform the check:

$$\text{abs(first QP value} - \text{second QP value)} \leq 1 \tag{1}$$

Based on the selection of the first QP value and the second QP value that satisfies the equation (1), the quantizer 208 may utilize the selected first QP value and the selected second QP value for quantization of the first sub-block 304A and the second sub-block 304B of the exemplary block 302. For example, the quantizer 208 may execute quantization coding on the first sub-block 304A and the second sub-block 304B of the exemplary block 302 based on the first QP value and the second QP value, respectively, to generate quantized-transformed coefficients of the exemplary block 302. The quantized-transformed coefficients of the exemplary block 302 may be further processed by the image-processing apparatus 102 to generate an encoded bit stream of the exemplary block 302.

Figure 3B:
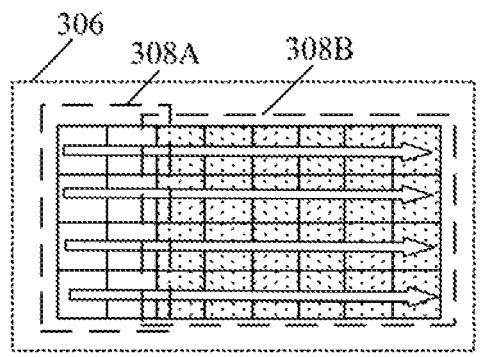
FIG. 3B is a block diagram that illustrates a second exemplary scenario for quantization partitioning for enhanced image compression, in accordance with an embodiment of the disclosure.

FIG. 3B is a block diagram that illustrates a second exemplary scenario for quantization partitioning for enhanced image compression, in accordance with an embodiment of the disclosure. FIG. 3B is described in conjunction with elements from FIG. 1 and FIG. 2. With reference to FIG. 3B, an exemplary block 306 that corresponds to a first block of a plurality of blocks of an input image is illustrated. The exemplary block 306 may correspond to an "8×4 block", as shown. The exemplary block 306, as shown, is further partitioned (a logical partitioning for quantization) into a plurality of sub-blocks, for example, a first sub-block 308A and a second sub-block 308B.

The exemplary block 306 may be obtained based on execution of transform coding on the first block. The transform coding may be executed based on application of a transform type, such as a row-based 1D FDCT, to generate transformed coefficients. The generated transformed coefficients may be associated with a plurality of frequencies. For example, based on application of the row-based 1D FDCT on the "8×4 block", such as the exemplary block 306, then the transformed coefficients of the exemplary block 306 may be generated with "8" different frequencies. In such scenario, the image processor 202 may partition (a logical partitioning) the exemplary block 306 into the first sub-block 308A and the second sub-block 308B, based on classification of the different frequencies of the generated transformed coefficients. For example, the generated transformed coefficients that are associated with lowest "2" frequencies among the "8" different frequencies may be partitioned into the first sub-block 308A, as shown. The lowest "2" frequencies are identified based on a comparison with a threshold frequency value. The remaining transformed coefficients (having frequencies other than the lowest "2" frequencies) are partitioned into the second sub-block 308B, as shown Based on the partition of the exemplary block 306 into the first sub-block 308A and the second sub-block 308B, the quantizer 208 may be configured to select a plurality of QP values, for example, a first QP value and a second QP value, from a defined QP range. The first QP may be different from the second QP value. For transformed coefficients, which corresponds to the lowest "2" frequencies among the "8" different frequencies, higher QP value ($QP_H$), for example, 6 or 7, from the defined range may be selected. Similarly, for transformed coefficients, which corresponds to the remaining higher frequencies of the "8" different frequencies, lower QP value ($QP_L$), for example, 1 or 2, from the defined range, such as "0 to 7", may be selected. In this case, the first QP value refers to the higher QP value ($QP_H$) selected for the first sub-block 308A to quantize the transformed coefficients with the lowest "2" frequencies of the first sub-block 308A. Similar to the selection of the first QP value for the first sub-block 308A, the quantizer 208 may select the second QP value that refers to the lower QP value ($QP_L$), for the second sub-block 308B. The QP values may be classified as lower and higher based on a threshold QP value, for example, threshold of QP value "3" in a case when the defined QP range is "0" to "7". In accordance with an embodiment, the threshold QP value may also depend on the image content and/or bandwidth of the communication network 108. In order to reduce the signaling cost, the selection of the number of higher QP values ($QP_H$), such as the first QP value, and the number of lower QP values ($QP_L$), such as the second QP value, may be controlled based on the following exemplary equation (2) of FIG. 3B.

$$\text{Number of } QP_L = \text{Number of } QP_H, \text{ OR (Number of } QP_H + 1) \quad (2)$$

The quantizer 208 may then execute quantization coding for the transformed coefficients of the first sub-block 308A and the second sub-block 308B of the exemplary block 306, based on the first QP value and the second QP value, respectively, to generate quantized-transformed coefficients. The quantized-transformed coefficients of the exemplary block 306 may be further processed by the image-processing apparatus 102 to generate an encoded bit stream.

Figure 3C:
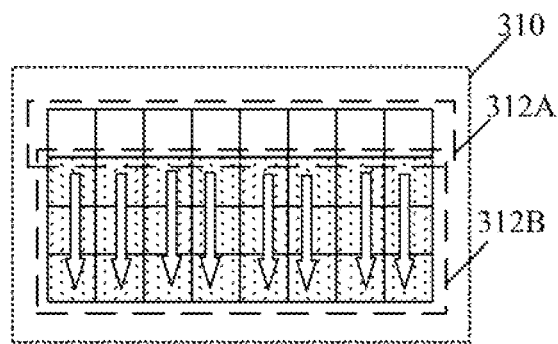
FIG. 3C is a block diagram that illustrates a third exemplary scenario for quantization partitioning for enhanced image compression, in accordance with an embodiment of the disclosure.

FIG. 3C is a block diagram that illustrates a third exemplary scenario for quantization partitioning for enhanced image compression, in accordance with an embodiment of the disclosure. FIG. 3C is described in conjunction with elements from FIG. 1 and FIG. 2. With reference to FIG. 3C, an exemplary block 310 that corresponds to a first block of a plurality of blocks of an input image is illustrated. The exemplary block 310 may correspond to an "8×4 block", as shown. The exemplary block 310, as shown, is further partitioned (a logical partitioning for quantization) as a first sub-block 312A and a second sub-block 312B.

The exemplary block 310 may be obtained based on execution of transform coding on the first block. The transform coding may be executed based on application of a transform type, such as a column-based 1D FDCT, to generate transformed coefficients. The generated transformed coefficients may be associated with a plurality of frequencies. For example, when the column-based 1D FDCT is applied on the "8×4 block", such as the exemplary block 310, then the transformed coefficients of the exemplary block 306 may be generated with "4" different frequencies. In such scenario, the image processor 202 may partition the exemplary block 306 into the first sub-block 308A and the second sub-block 308B, based on classification of the different frequencies of the generated transformed coefficients. For example, the generated transformed coefficients that are associated with a lowest frequency among the "4" different frequencies may be partitioned into the first sub-block 312A, as shown. The lowest "1" frequency is identified based on comparison with a threshold frequency value. The remaining transformed coefficients (having frequencies other than the lowest frequency) are partitioned into the second sub-block 312B, as shown. Based on the partition of the exemplary block 310 into the first sub-block 312A and the second sub-block 312B, the quantizer 208 may be configured to select a plurality of QP values, for example, a first QP value and a second QP value, from a defined QP range. The first QP value may be different from the second QP value. For transformed coefficients, which corresponds to the lowest frequency of the "4" different frequencies, higher QP value ($QP_H$), for example, 6 or 7, from the defined range, such as "0 to 7", may be selected. Similarly, for transformed coefficients, which corresponds to the remaining higher frequencies of the "4" different frequencies, lower QP value ($QP_L$), for example, 1 or 2, from the defined range, such as "0 to 7", may be selected. In this case, the first QP value refers to the higher QP value ($QP_H$) selected for the first sub-block 312A to quantize the transformed coefficients with the lowest frequency of the "4" different frequencies. Similar to the selection of the first QP value for the first sub-block 312A, the quantizer 208 may select the second QP value that refers to the lower QP value ($QP_L$), for the second sub-block 312B. The QP values may be classified as lower and higher based on a threshold QP value, for example, threshold of QP value "3" in a case when the defined QP range is "0" to "7". In order to reduce the signaling cost, the selection of the number of higher QP values ($QP_H$), such as the first QP value, and the number of lower QP values ($QP_L$), such as the second QP value, may be controlled based on the following exemplary equation (2) of FIG. 3B. Thereafter, the quantizer 208 may execute quantization coding of the transformed coefficients of the first sub-block 312A and the second sub-block 312B of the exemplary block 310, based on the first QP value and the second QP value, respectively, to generate quantized-transformed coefficients. The quantized-transformed coefficients of the exemplary block 310 may be further processed by the image-processing apparatus 102 to generate an encoded bit stream.

Figure 4A:
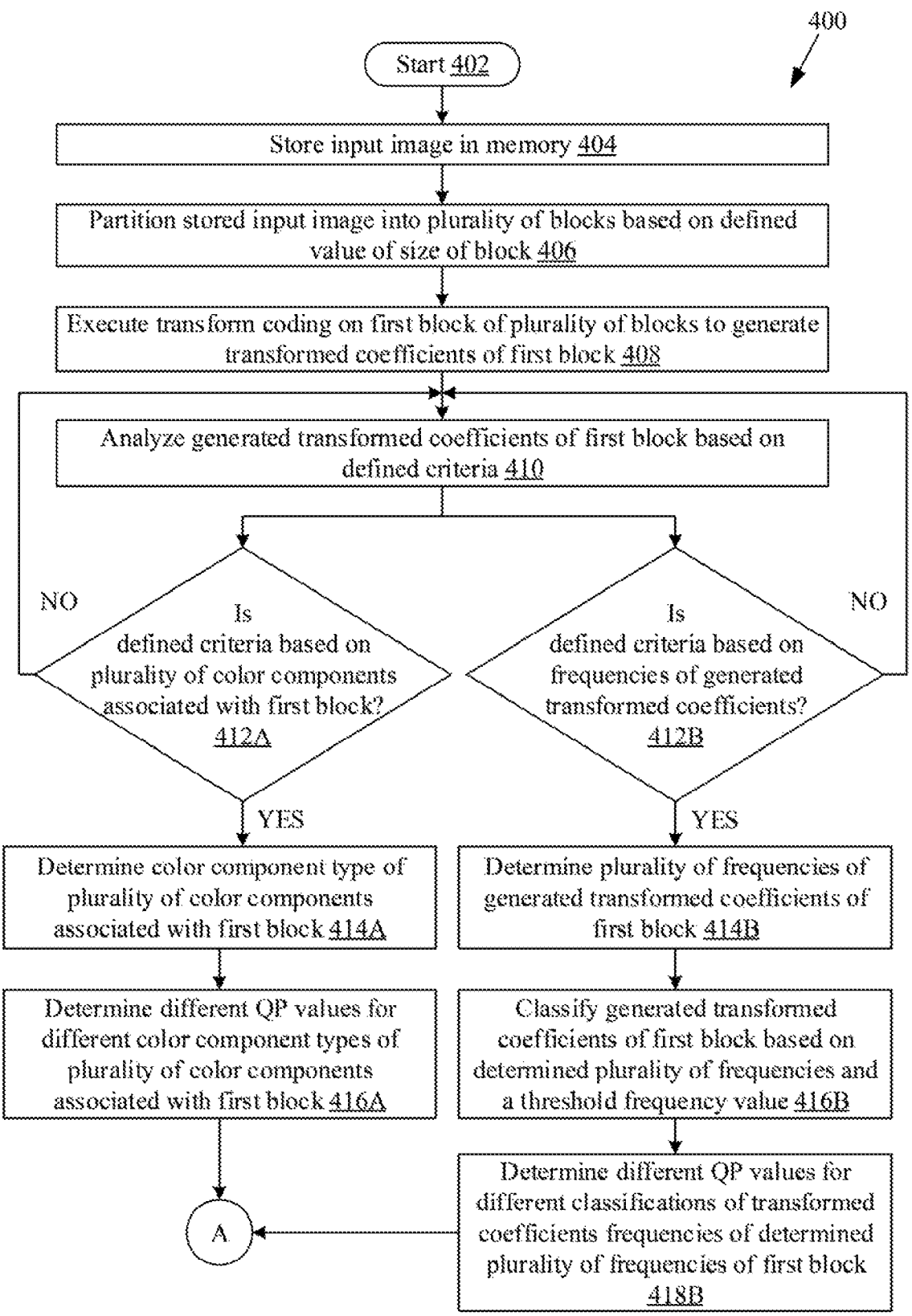
FIGS. 4A and 4B, collectively, depicts a flow chart that illustrates exemplary operations for quantization partitioning for enhanced image compression, in accordance with an embodiment of the disclosure.
Figure 4B:
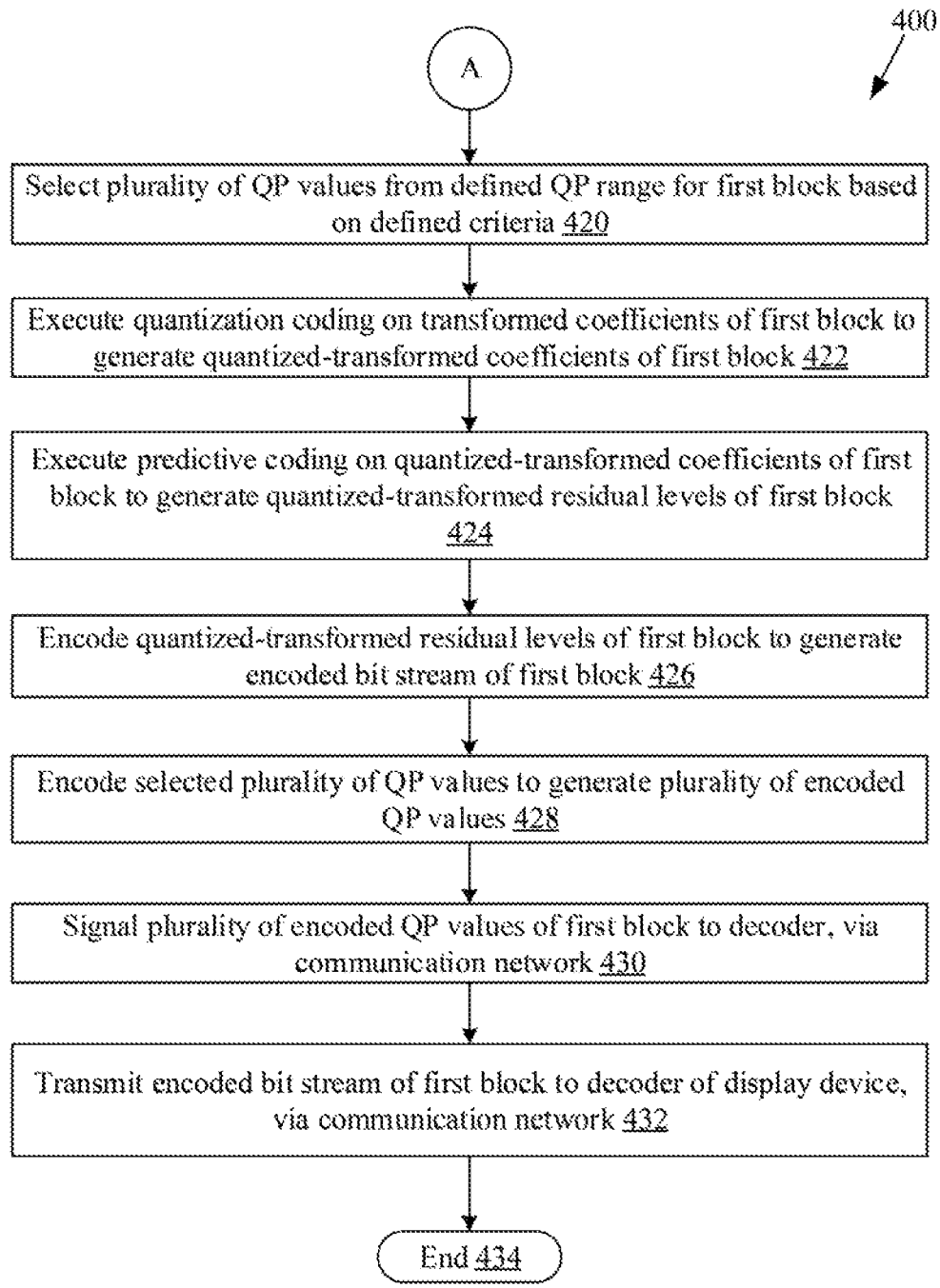

FIGS. 4A and 4B, collectively, depicts a flow chart that illustrates exemplary operations for quantization partitioning for enhanced image compression, in accordance with an embodiment of the disclosure. With reference to FIGS. 4A and 4B, there is shown a flow chart 400. The flow chart 400 is described in conjunction with, for example, FIGS. 1, 2, 3A, 3B, and 3C. The method starts at 402 and proceeds to 404.

At 404, an input image may be stored in the memory 204. The image processor 202 may receive the input image from the external electronic device or the image-capture device that is integrated with the image-processing apparatus 102. The received input image may be stored in a first storage space having a first storage access bandwidth in the memory 204. The received input image may be transmissible from the image-processing apparatus 102 to the display device 104, via the communication network 108, in a first time period.

At 406, the stored input image may be partitioned into a plurality of blocks. The image processor 202 may be configured to partition the stored input image into the plurality of blocks based on a defined value of a size of a block. During processing of the stored input image, an image buffer that corresponds to the input image may be temporally stored in the memory 204 for the partition.

At 408, transform coding may be executed on a first block of the plurality of blocks to generate transformed coefficients of the first block. The transform coder 206 may execute transform coding on pixel values of the first block, based on a transform type selected from a row-based forward transform type and a column-based forward transform type. For example, the transform coding of the first block may be executed by a row-based 1D FDCT or a column-based 1D FDCT, to generate the transformed coefficients of the first block. In another example, the transform coding of the first block may be executed by 2D FDCT.

At 410, the generated transformed coefficients of the first block may be analyzed based on defined criteria. The quantizer 208 may be configured to analyze the generated transformed coefficients of the first block. At 412A, it may be checked whether the defined criteria is based on a plurality of color components associated with the first block. In cases, where the defined criteria is based on the plurality of color components associated with the first block, control passes to 414A, else the control may return to 410. At 412B, it may be checked whether the defined criteria is based on frequencies of the generated transformed coefficients of the first block. In cases, the defined criteria is based on the frequencies of the generated transformed coefficients of the first block, control passes to 414B, else the control may return to 410.

At 414A, a color component type of each of the plurality of color components associated with the first block, may be determined. At 416A, different QP values from a defined QP range may be determined for different color component types of the plurality of color components associated with the first block. The first block may be further partitioned for quantization (for example, a logical partitioning) for each color component type of the plurality of color components. The control may then pass to 420 (FIG. 3B).

At 414B, a plurality of frequencies of the generated transformed coefficients of the first block, may be determined. A specific transform type, from the different transform types, applied on the first block for the generation of the transformed coefficients, may be detected. At 416B, the generated transformed coefficients of the first block may be classified based on the determined plurality of frequencies of the generated transformed coefficients and a threshold frequency value. At 418B, different QP values from a defined QP range may be determined for different classification of the transformed coefficients frequencies of the determined plurality of frequencies of the first block. The first block may be further partitioned for quantization (for example, a logical partitioning) for each classification of the transformed coefficients frequencies. The control may then pass to 420 (FIG. 3B).

At 420, a plurality of QP values may be selected from the defined QP range for the first block based on the defined criteria. An example of selection of the plurality of QP values from the defined QP range based on the plurality of frequencies of the transformed coefficients and the transform type applied on the first block has been shown and described, for example, in FIGS. 3B and 3C. In some embodiments, the image processor 202 may be configured to further partition the first block into the plurality of sub-blocks based on a specified setting. In such embodiments, the plurality of QP values from the defined QP range may be determined and selected for the plurality of sub-blocks of the first block. An example of selection of the plurality of QP values from the defined QP range based on partition of the first block has been shown and described, for example, in FIG. 3A.

At 422, quantization coding may be executed on the transformed coefficients of the first block to generate quantized-transformed coefficients of the first block. The quantizer 208 may execute quantization coding on the transformed coefficients of the first block based on the selected plurality of QP values for the first block.

At 424, predictive coding may be executed on the quantized-transformed coefficients of the first block to generate quantized-transformed residual levels of the first block. The predictor 210 may execute predictive coding on the quantized-transformed coefficients of the first block based on a prediction type selected from a DC-only based modulation and/or an all-frequency-based modulation. Each of the prediction type may be based on DPCM.

At 426, the quantized-transformed residual levels of the first block may be encoded to generate an encoded bit stream of the first block. The encoded bit stream may be storable in a reduced second storage space (in comparison to the first storage space) having a reduced second storage access bandwidth (in comparison to the first storage access bandwidth). The entropy coder 212 may execute entropy coding on the quantized-transformed residual levels of the first block to generate the encoded bit stream. For example, the DC component of the first block may be encoded by PCM-based coding type in association with the predictor 210. The AC components of the first block may be entropy coded by Huffman table-based encoding, Exponential-Golomb encoding, Universal coding, Huffman coding, Arithmetic coding, and/or the like, to generate the encoded bit stream.

At 428, the selected plurality of QP values for the first block may also be encoded to generate a plurality of encoded QP values. The entropy coder 212 may be configured to encode the selected plurality of QP values of each of the plurality of first blocks of the input image, by a fixed length code or a variable length code. At 430, the plurality of encoded QP values of the first block may be signaled to the decoder 106, via the communication network 108. The entropy coder 212 may be configured to signal the plurality of encoded QP values of the first block to the decoder 106.

At 432, the encoded bit stream of the first block may be transmitted to the decoder 106 of the display device 104, via the communication network 108. The entropy coder 212 may transmit the encoded bit stream of the first block to the decoder 106. The plurality of encoded QP values of the first block may be signaled along with the encoded bit stream, to the decoder 106, via the communication network 108. The decoder 106 may receive the encoded bit stream of the first block for decompression. The entropy coder 212 may be configured to transmit the encoded bit stream of the first block that further comprises the plurality of encoded QP values to the decoder 106, via the communication network 108, in a reduced second time period (in comparison to the first time period). The control passes to the end 434.

In accordance with an embodiment of the disclosure, an image-processing apparatus for quantization partitioning for enhanced image compression is disclosed. The image-processing apparatus 102 (shown in FIG. 1), may comprise one or more circuits. The one or more circuits may correspond to, for example, the image processor 202, the transform coder 206, the quantizer 208, the predictor 210, and the entropy coder 212 (shown in FIG. 2). The one or more circuits may be configured to partition an input image into a plurality of blocks. The input image may be stored in a first storage space having a first storage access bandwidth. The one or more circuits may be further configured to select a plurality of QP values from a defined QP range for a first block of the plurality of blocks. The plurality of QP values may be selected from the defined QP range based on defined criteria. The defined criteria may be based on at least a plurality of color components associated with the first block, a transform type applied on the first block to generate transformed coefficients of the first block, a plurality of frequencies associated with the generated transformed coefficients, or a combination thereof. The one or more circuits may be further configured to encode, by the selected plurality of QP values, the first block to generate an encoded bit stream of the first block. The encoded bit stream of the first block may be storable in a reduced second storage space (in comparison to the first storage space) in the memory with a reduced second storage access bandwidth (in comparison to the first storage space).

In conventional image compression techniques, an end-to-end compression and decompression may be performed on digital image data and/or videos, such as an input image. Typically, in conventional image/video compression techniques, either a single coding technique is used, such as DCT or 2D DCT, or a plurality of coding techniques denoted as a coding scheme are used, such as DCT and entropy coding, DCT and quantization, quantization and entropy coding, in different permutation and combination of known coding schemes and standards, such as Joint Photographic Experts Group (JPEG) and High Efficiency Video Coding (HEVC). A particular sequence of selected coding scheme may change the amount of compression. The disclosed codec, such as the image-processing apparatus 102, may generate an encoded bit stream of the input image, by application of a different sequential coding scheme, such as firstly transform coding, followed by quantization coding, DPCM coding, and then entropy coding. Unlike the HEVC, where DPCM is performed prior to the transform coding, the disclosed codec, such as the image-processing apparatus 102, may generate the encoded bit stream of the input image by application of the different sequential encoding scheme, which starts with the transform coding by application of the forward transform.

In conventional image/video compression techniques, at the time of storage of an image, a high storage space (e.g., a first storage space) having a high storage access bandwidth (e.g., a first storage access bandwidth) may be required to store the image. Furthermore, at the time of transmission of an encoded bit stream of the image, the transmission bit rate of the encoded bit stream, for example, after entropy coding, may be reduced. Such type of reduction in the operating speed of the codec (such as the image-processing apparatus 102) may occur due to less efficient compression. Though, the codec may continue to operate, but reduces the overall operating speed of the codec. Furthermore, extra storage space and higher memory bandwidth may be required for storage and transmission of the encoded bit stream of the block in case of less efficient compression. Thus, an additional cost to meet the extra storage space and the higher memory bandwidth may add up to an overall storage cost or computational complexity of a conventional codec.

In contrast, the disclosed codec, such as the image-processing apparatus 102, may encode a single block of a plurality of blocks of the input image by a plurality of different QP values, which results in significantly efficient compression of the input image that is then storable in a reduced storage space (e.g., a second storage space that is less than the first storage space) having a reduced storage access bandwidth (e.g., a second storage access bandwidth that is less than the first access bandwidth). Furthermore, the encoded bit stream of the block may be transmitted in a reduced second time period in comparison to the first time period. Therefore, the need for the extra storage space and higher memory bandwidth for storage and transmission of the encoded bit stream of the block may be reduced, thereby, reducing the overall storage cost and computational complexity of the codec, such as the image-processing apparatus 102. Therefore, a low latency and low complexity apparatus and method is provided that efficiently compresses and decompresses digital data with visually lossless results.

The image-processing apparatus 102 may find application in compression of ultra-definition video, image, 4K video, and other digital images or video used in consumer electronic devices, such as TV, camera, smart phone, or media streaming apparatus. In accordance with an exemplary aspect of the disclosure, the image-processing apparatus 102 may be a camera that may include a codec, such as the image-processing apparatus 102 and the decoder 106. Thus, all the operations executed by the image-processing apparatus 102 as described in the present disclosure, may also be executed by the camera. Usually, the during capture of an image or a sequence of image frames of a video by the camera, raw data is captured which needs to be compressed to save memory space and memory access bandwidth. In view of the increased popularity of high definition image or video, such as ultra-definition video, image, 4K video, and other digital images or video, it is increasingly critical to develop advanced image compression techniques that may make possible high compression and still exemplify low hardware complexity. The camera may have a limited memory space as provided by the manufacturer, or may be expandable, by use of a flash memory, such as the SD card. However, additional memory hardware involves additional cost. The camera may generate the encoded bit stream of the image based on a plurality of QP values (selected from a defined QP range) for each block of the input image, as described, for example, in FIGS. 3A to 3C. Further, at the time of display of the compressed image (such as the generated encoded bit stream with the quantized value signal stored as compressed image), the codec of the camera may read the decoding parameters (for example, an applied transform type, an applied prediction type, the selected plurality of QP values, and an applied coding type). Thereafter, the codec of the camera may determine the decoding parameters and the type of sequential encoding scheme applied on the input image. Accordingly, the codec may execute inverse scanning, DPCM demodulation, inverse quantization, and inverse transform to render the input image on the display device 104. Example of various operations executed by the camera may be understood, for example, from the flow chart 400 of FIGS. 4A and 4B. Similar to the camera, all the operations executed by the image-processing apparatus 102 as described in the present disclosure, such as in FIGS. 1 to 4, may be executed by the image-processing apparatus 102 in case of implementation in a camcorder, a smart phone, or a TV, for efficient compression to save the memory space, as described.

Various embodiments of the disclosure may provide a non-transitory, computer readable medium and/or storage medium, and/or a non-transitory machine readable medium and/or storage medium stored thereon, a machine code and/or a computer program with at least one code section executable by a machine and/or a computer for quantization partitioning for enhanced image compression. The at least one code section may cause the machine and/or computer to perform the steps that comprise partition a stored input image into a plurality of blocks. The at least one code section in the image-processing apparatus 102 may cause the machine and/or computer to perform the operations that comprise selecting a plurality of QP values from a defined QP range for a first block of the plurality of blocks based on a defined criterion. The defined criterion for the selection of the plurality of QP values may be based on at least a plurality of color components associated with the first block and/or a transform type applied on the first block to generate transformed coefficients of the first block. The at least one code section in the image-processing apparatus 102 may cause the machine and/or computer to perform the operations that further comprise encode, by the selected plurality of QP values, the first block to generate an encoded bit stream of the first block. The encoded bit stream of the first block may be storable in a reduced second storage space (in comparison to the first storage space) in the DRAM with a reduced second storage access bandwidth (in comparison to the first storage access bandwidth). The disclosed method for quantization partitioning for enhanced image compression reduces the DRAM bandwidth.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An image-processing apparatus for image compression, said image-processing apparatus comprising:
   a memory configured to store an input image in a first storage space, wherein said first storage space has a first storage access bandwidth to access said input image from said first storage space; and
   at least one circuit configured to:
      partition said input image into a plurality of blocks based on a size of each block of said plurality of blocks;
      generate a plurality of transformed coefficients of a first block of said plurality of blocks;
      classify said plurality of transformed coefficients of said first block based on a comparison of a plurality of frequencies of said plurality of transformed coefficients with a threshold frequency value;
      determine a bit-coverage value by application of each of a plurality of encoding schemes to said first block of said plurality of blocks, wherein said bit-coverage value is a count of bits encoded losslessly in said first block for each of said plurality of encoding schemes;
      select a plurality of quantization parameter (QP) values from a defined QP range for said first block based on said classification of said plurality of transformed coefficients and said bit-coverage value;
      encode said first block based on said selected plurality of QP values; and
      generate an encoded bit stream of said first block based on said encoded first block, wherein
         said encoded bit stream is storable in a second storage space in said memory,
         said second storage space is different from said first storage space,
         said second storage space has a second storage access bandwidth to access said encoded bit stream of said first block from said second storage space, and
         said second storage access bandwidth is less than said first storage access bandwidth.

2. The image-processing apparatus according to claim 1, wherein said at least one circuit is further configured to select said plurality of QP values based on partition of said first block into a plurality of sub-blocks.

3. The image-processing apparatus according to claim 2, wherein said at least one circuit is further configured to control said selection of said plurality of QP values from said defined QP range based on a defined value and a difference between two QP values of said selected plurality of QP values.

4. The image-processing apparatus according to claim 1, wherein said at least one circuit is further configured to select said plurality of QP values based on a plurality of color components associated with said first block.

5. The image-processing apparatus according to claim 1, wherein said at least one circuit is further configured to select said plurality of QP values based on application of a transform type on said first block to generate said plurality of transformed coefficients.

6. The image-processing apparatus according to claim 1, wherein said at least one circuit is further configured to
   generate said encoded bit stream of said first block based on a sequential encoding scheme that comprises a sequential application of transform coding, followed by quantization coding, predictive coding, and entropy coding.

7. The image-processing apparatus according to claim 6, wherein said at least one circuit is further configured to apply said quantization coding on a result of said transform coding of said first block, based on said selected plurality of QP values.

8. The image-processing apparatus according to claim 1, wherein said at least one circuit is further configured to:
encode said plurality of QP values of said first block based on one of a fixed length code or a variable length code; and
generate a plurality of encoded QP values.

9. The image-processing apparatus according to claim 8, wherein said at least one circuit is further configured to signal said plurality of encoded QP values in said encoded bit stream of said first block to a decoder that receives said encoded bit stream of said first block for decompression.

10. An image-processing method for image compression, said image-processing method comprising:
in an image-processing apparatus:
storing an input image in a first storage space in a memory, wherein said first storage space has a first storage access bandwidth to access said input image from said first storage space;
partitioning, by one or more circuits, said input image into a plurality of blocks based on a size of each block of said plurality of blocks;
generating, by said one or more circuits, a plurality of transformed coefficients of a first block of said plurality of blocks;
classifying, by said one or more circuits, said plurality of transformed coefficients of said first block based on a comparison of a plurality of frequencies of said plurality of transformed coefficients with a threshold frequency;
determining, by said one or more circuits, a bit-coverage value by application of each of a plurality of encoding schemes to said first block of said plurality of blocks, wherein said bit-coverage value is a count of bits encoded losslessly in said first block for each of said plurality of encoding schemes;
selecting, by said one or more circuits, a plurality of quantization parameter (QP) values from a defined QP range for said first block based on said classification of said plurality of transformed coefficients and said bit-coverage value;
encoding, by said one or more circuits, said first block based on said selected plurality of QP values; and
generating, by said one or more circuits, an encoded bit stream of said first block based on said encoding, wherein
said encoded bit stream is storable in a second storage space in said memory,
said second storage space is different from said first storage space,
said second storage space has a second storage access bandwidth to access said encoded bit stream of said first block from said second storage space, and
said second storage access bandwidth is less than said first storage access bandwidth.

11. The image-processing method according to claim 10, further comprising selecting, by said one or more circuits, said plurality of QP values based on partition of said first block into a plurality of sub-blocks.

12. The image-processing method according to claim 10, further comprising controlling, by said one or more circuits, said selection of said plurality of QP values from said defined QP range based on a defined value and at least an absolute value, wherein said absolute value corresponds to a difference between two QP values of said selected plurality of QP values.

13. The image-processing method according to claim 10, further comprising selecting, by said one or more circuits, said plurality of QP values based on a plurality of color components associated with said first block.

14. The image-processing method according to claim 10, further comprising selecting, by said one or more circuits, said plurality of QP values based on application of a transform type on said first block to generate said plurality of transformed coefficients.

15. The image-processing method according to claim 10, further comprising generating, by said one or more circuits, said encoded bit stream of said first block based on a sequential encoding scheme that comprises a sequential application of transform coding, followed by quantization coding, predictive coding, and entropy coding.

16. The image-processing method according to claim 15, further comprising applying said quantization coding on a result of said transform coding of said first block, based on said selected plurality of QP values.

17. The image-processing method according to claim 10, further comprising:
encoding, by said one or more circuits, said selected plurality of QP values of said first block based on one of a fixed length code or a variable length code; and
generate a plurality of encoded QP values.

18. The image-processing method according to claim 17, further comprising signaling, by said one or more circuits, said plurality of encoded QP values in said encoded bit stream of said first block to a decoder that receives said encoded bit stream of said first block for decompression.

* * * * *